United States Patent [19]

Perrier et al.

[11] 3,918,899

[45] Nov. 11, 1975

[54] CARBOXYMETHYL (CM) COTTONS PREPARED IN NON-AQUEOUS MEDIA

[75] Inventors: Dorothy M. Perrier; Ruth R. Benerito, both of New Orleans, La.

[73] Assignee: The United States of America as represented by the Secretary of Agriculture, Washington, D.C.

[22] Filed: Aug. 16, 1974

[21] Appl. No.: 498,150

[52] U.S. Cl.............. 8/120; 8/120; 106/197 CM; 260/231 CMC
[51] Int. Cl.² .......................................... D06M 13/26
[58] Field of Search............. 8/129, 120, 128 A; 260/231 CMC, 231 R; 106/197 CM

[56] References Cited
UNITED STATES PATENTS

| | | | |
|---|---|---|---|
| 3,007,763 | 11/1961 | Adams | 8/192 |
| 3,079,215 | 2/1963 | Koenig | 8/128 R |
| 3,489,503 | 1/1970 | Pierce | 8/120 |
| 3,574,188 | 4/1971 | Takehara | 260/231 |

OTHER PUBLICATIONS

Chem. Abst. 74: 14150n.

*Primary Examiner*—Theodore Morris
*Attorney, Agent, or Firm*—M. Howard Silverstein; Max D. Hensley

[57] ABSTRACT

Fibrous cellulose material is impregnated with a swelling reagent, solvent exchanged to remove all water, and then reacted with an alcoholic solution of sodium methoxide. The resulting sodium cellulosate is washed in tertiary butanol and then reacted in a dimethylsulfoxide solution of a salt of monochloro acetic acid. The final product is a partial cellulose ester, carboxymethyl (CM) cellulose, that possesses cation exchange properties. These CM-cottons of relatively high ion exchange capacities or of high degree of substitution (DS) are insoluble in water when in either the acid or salt forms. Therefore CM-cottons so prepared can be used to improve wrinkle recoveries of cotton fabrics or can be used as substrates having built-in catalytic sites that will promote subsequent reactions of cotton with conventional dimethylol derivatives used to improve wrinkle recovery properties of cotton fabrics.

10 Claims, No Drawings

CARBOXYMETHYL (CM) COTTONS PREPARED IN NON-AQUEOUS MEDIA

PRIOR ART AND BACKGROUND

The prior art teaches the preparation of CM-cottons in aqueous media and such CM-cottons have been used in a variety of applications, some of which are based on the solubility of CM-cottons in water or in aqueous base. For example, G. C. Daul, R. M. Reinhardt, and J. D. Reid in Text. Res. J. 23, 719 (1953) reported that CM cotton yarns and threads with a D.S. of only 0.17 to 0.25 became gelatinous, disintegrated in water, but do not completely dissolve whereas those of D.S. of 0.30 are completely soluble in water. In such aqueous methods described in the prior art, a D.S. as high as 0.25–0.30 can be obtained only after a series of repetitive carboxymethylations and by drastic increases in reactant ratios. Such aqueously prepared CM-cotton of low D.S. have been used as cation exchangers and have also been used as substrates that have built-in catalytic sites to catalyze subsequent cellulosic reactions. D. M. Perrier and R. R. Benerito in Text. Res. J. 41, 680 (1971) have reported on the use of ion exchanged cottons prepared aqueously as in-situ catalysts for subsequent cellulose etherifications.

In contrast to products of the prior arts, the CM-cottons prepared in non-aqueous media according to the present invention have different physical and chemical properties. This invention makes it possible to prepare a CM-cotton in fabric form with a D.S. as high as 0.3 by a simple one-step carboxymethylation at room temperature. The hydrogen-bonded network in the final product is different from that resulting in the conventional aqueous methods because of the hydrogen-bonding capabilities of water, the CM-cottons formed by this invention in the absence of water are insoluble in water even in the salt form. Another consequence of the non-aqueous process described in this invention is that the order of exchange of cations of CM-cottons prepared in this invention differs from that of CM-cottons prepared aqueously and such cation exchangers prepared by this invention maintain their fabric integrities even at relatively high D.S. values. CM-cottons prepared non aqueously by the instant process yield a pH of 4 in contrast to CM-cottons prepared aqueously that yield a pH of 2 for an equivalent meqs per g of carboxylic sites. Slopes of titration curves of CM cottons prepared by this invention also differ from slopes of titration curves of aqueously prepared CM-cottons. It is more difficult to replace $Na^+$ ions of the salt form of nonaqueously prepared CM-cottons than those of aqueously prepared CM-cottons described in prior art. By the process of this invention, the $Na^+$ ions of the salt form of these new CM cottons are not replaced completely by $H^+$ ions until a pH of 2.5 is reached. The CM cottons prepared by the instant invention also have different ion selectivities than those CM cottons prepared aqueously. Equations Pertinent to this Invention a. $CellO\ H + CH_3O^-\ Na^+ \xrightarrow{CH_3OH} CellO^-\ Na^+ + CH_3OH$
b. $CellO^-\ Na^+ + ClCH_2COO^-\ Na^+ \xrightarrow{DMSO} CellOCH_2COO^-\ Na^+ + Na^+Cl^-$ CM-cotton Equation (a) represents the known art for preparation of sodium cellulosate in alcoholic media. Equation (b) pertains to the instant invention and the reaction (b) must follow (a) after a sequence specified in this invention. The sequence must be continuous to avoid introduction of moisture for practicing the present invention. Immediately after sodium cellulosate is formed, it must be washed with t-butanol to prevent the reversal of equation (a) and either used immediately or stored under nitrogen in t-butanol until reaction (b) is performed. Use of a solvent such as DMSO for reaction represented in equation (b) is essential to assume the progress of reaction (b) toward the product CM-cotton and precipitation of NaCl.

The D.S. of sodium in sodium cellulosate can be varied. In general sodium cellulosates containing from 3.9 meqs per g have been used for reactions represented by equation (b). The cation exchange capacity of the final CM-cotton can be partially regulated by the meqs of $Na^+$ per g used, but regardless of the amount, only about one-third of the $Na^+$ sites are converted to CM sites. The cation exchange capacity of the final CM-cotton can also be regulated by use of an excess of the salt of monochloroacetate and times of reaction that varied from a few minutes to 24 hours. The temperature of the reaction does not greatly affect the D.S. of the product and one of the advantages of the present invention is that a D.S. of 0.25 can be easily obtained by a one-step reaction at room temperature whereas the prior art in aqueous media requires more drastic steps and results in products of higher solubilities in water than those of the D.S. prepared by the present invention. After the desired time of reaction in the present invention, the carboxymethylation is stopped by removing the fabric, washing the fabric in excess DMSO and then in deionized water. Fabrics are then ironed dry and allowed to air equilibrate. Once these fabrics were prepared non-aqueously they could then be subsequently reacted in aqueous media.

GENERAL ASPECTS OF THE PRESENT INVENTION

The present invention can be described as (1) a fibrous cellulosic derivative that has cation exchange properties and that has weak acid properties when in the acid form, (2) the process required to produce these exchangers, and (3) the process whereby the cation exchange groups is used to catalyze subsequent reactions between dimethylolated ureas and the CM-cottons to produce cottons with improved wrinkle recoveries.

The material substrates to which this invention can be applied include cotton, rayon, ramie, jute, flax, and the like cellulosic materials. In the process of investigation, the bulk of the work was done with cotton, mainly in the form of woven fabrics. Those skilled in the art should readily visualize the extensions of the products and process of this invention.

With reference to the salt of monochloroacetic acid, it should be noted that any salt such as the sodium or substituted ammonium salts and quaternary ammonium salts that have some solubility in DMSO can be used. Aprotic solvents other than DMSO of similar properties might be used under anhydrous conditions. Sodium cellulosates of various D.S. values can be used.

In general cotton fabrics were pretreated with aqueous 23 percent NaOH to swell the cellulosic network. They were then washed in water to rid the base and neutralized with dilute acetic acid being washed with deionized water. These steps are equivalent to mercerization processes described in the prior art. For the present invention, this mercerization process is followed by a solvent exchange process to remove all water from the mercerized cottons. Fabrics were solvent exchanged with anhydrous methanol before being reacted in 2 Molar sodium methoxide in anhydrous methanol for various times at room temperature. The sodium cellulosate of various D.S. values are subsequently washed in anhydrous t-butanol before being reacted in solution containing about 2.5 percent of the salt of monochloroacetic acid in anhydrous dimethylsulfoxide (DMSO) for various times at room temperature.

To determine the cation exchange capacity of the CM-cottons in terms of meqs. of carboxyl groups per 1 g of exchanger, an accurately weighed sample of each product of sufficient weight to contain approximately 0.7 meqs. of replaceable cation was placed in a specially constructed titration flask of 250 ml capacity containing 50 ml of conductivity water under a nitrogen atmosphere. The titration flask had 4 ground glass outlets to accommodate a microburet in the center, an inlet-outlet tube for nitrogen, the glass electrode, and the standard calomel electrode. All pH measurements were made with a Beckman Model G Research pH meter measured to ± 0.05 pH unit The accompanying Figure is illustrative of titration curves obtained with the acid form (curve ABC) titrated vs. standardized base and of the salt form (curve DEF) of a CM-cotton prepared by this invention.

All CM-cottons in both acid and salt forms produced by the present invention were not only insoluble in organic solvents used in their preparation but were also insoluble in water, aqueous acids and aqueous bases as strong as 23 percent NaOH. Replacement of $Na^+$ ions from the sodium salt forms of the CM cottons prepared by non-aqueous process of this invention by monovalent cations of various sizes was more difficult than replacement of $Na^+$ ions in the salt forms of CM cottons prepared in water as described in the prior art.

SUMMARY

This invention provides textiles which can best be described as carboxymethyl (CM) celluloses, a process for producing these CM-cottons in the absence of water at room temperature, and a process comprising reacting these CM-cottons with dimethylolated ureas to yield fabrics with improved wrinkle recoveries.

The following examples are provided to illustrate certain embodiments of the invention and should not be construed as limiting the invention in any manner whatever.

EXAMPLE 1

A series of seven 10 g samples of desized, scoured and bleached cotton printcloths (80 × 80 thread count) were rolled and immersed in glass cylinders provided with in-let and out-let tubes for nitrogen gas used to provide agitation and treated with 23 percent aqueous NaOH. Fabrics were washed free of excess base with distilled water, neutralized with dilute aqueous acetic acid, and then washed with deionized water. Fabrics were then solvent exchanged with anhydrous methanol to free fabrics of water and then reacted in 2 Molar sodium methoxide solutions in anhydrous methanol at room temperature for 1 hour to form sodium cellulosates in fabric form. These sodium cellulosates were washed with anhydrous t-butanol to free fabrics of excess sodium methoxide without destroying sodium cellulosate sites in fabrics. The sodium cellulosates were then reacted with 2.5 percent sodium monochloracetate in anhydrous DMSO at room temperature while being agitated with a stream of dry nitrogen gas. Times of reaction varied from 0.10 to 24 hours. After indicated reaction times, fabrics were washed in excess DMSO and then in deionized water before being ironed dry and air equilibrated. Data in Table I show extent of reactions and wrinkle recoveries imparted after the indicated times of reaction at room temperature.

TABLE I

| | | | | | |
|---|---|---|---|---|---|
| Effect of Time and Temperature on Degree of Carboxymethlation[1] | | | | | |
| Reaction conditions | | Carboxymethyl substitution | | Wrinkle recovery of acid form, (W+F)° | |
| Temp., °C | Time, hr | meq/g | D.S. | Wet | Conditioned |
| 25 | 0.10 | 0.227 | 0.037 | 229 | 212 |
|  | 0.25 | 0.366 | 0.060 | 244 | 191 |
|  | 0.50 | 0.510 | 0.085 | 243 | 220 |
|  | 0.75 | 0.583 | 0.100 | 252 | 213 |
|  | 1.00 | 0.645 | 0.108 | 255 | 229 |
|  | 2.00 | 0.817 | 0.139 | 276 | 202 |
|  | 24.00 | 1.304 | 0.299 | 275 | 215 |
| Control |  |  |  | 161 | 194 |

[1] Sodium cellulosate fabric contained 3.3 meqs $Na^+$ per gram cotton and reacted with eight fold excess of monochloroacetate

EXAMPLE 2

A series of thirteen samples of cotton printcloth were submitted to the process described in Example 1 but varying the temperature and reaction times. The results of this series are tabulated in Table II

TABLE II

| | | | | | |
|---|---|---|---|---|---|
| Effect of Time and Temperature on Degree of Carboxymethylation | | | | | |
| Reaction conditions | | Carboxymethyl substitution | | Wrinkle recovery of acid form, (W+F)° | |
| Temp., °C | Time, hr | meq/g | D.S. | Wet | Conditioned |
| 60 | 0.18 | 0.410 | 0.068 | | |
|  | 0.32 | 0.549 | 0.092 | | |
|  | 0.50 | 0.633 | 0.106 | | |
|  | 0.65 | 0.723 | 0.122 | | |
|  | 0.73 | 0.779 | 0.132 | | |
|  | 1.00 | 0.845 | 0.144 | | |
|  | 2.00 | 1.354 | 0.238 | 289 | 214 |
|  | 4.00 | 1.484 | 0.261 | 289 | 205 |
|  | 6.00 | 1.461 | 0.259 | 285 | 210 |
|  | 16.00 | 1.337 | 0.234 | 270 | 203 |
|  | 20.00 | 1.319 | 0.231 | 291 | 194 |
|  | 48.00 | 1.649 | 0.295 | 292 | 202 |
|  | 72.00 | 1.431 | 0.232 | 285 | 205 |
| Control |  |  |  | 218 | 192 |

EXAMPLE 3

A 10 gram sample of cotton was treated by the process described in Example 1 except that tetramethylammonium salt of monochloracetic acid was substituted for the sodium salt. AFter 24 hours of reaction at room temperature the D.S. of CM groups was 1.13 meqs/g and fabric properties were equivalent to those obtained with the sodium monochloroacetate after 24 hours of reaction at room temperature. At a D.S. of 0.26, this CM-cotton had wet wrinkle recovery of 270 (W+F)° and was insoluble in aqueous acid or base solutions.

EXAMPLE 4

A series of nine samples of cotton were treated according to the process described in Example 1 except that the relative amounts of monochloroacetate reagent and sodium cellulosate reagent were varied. A summary of data showing degree of conversion to CM cottons with a given amount of one reagent as the other reagent is varied is given in Table III.

TABLE III

Effect of Reagent Concentration on Degree of Carboxymethylation[1]

| Sodium Monochloroacetate meqs. | Carboxymethyl Substitution meqs. | | |
|---|---|---|---|
| | → Initial meqs. Cell ONa | | |
| | 24.13 | 37.80 | 65.80 |
| 31.41 | 4.28 | 9.78 | 15.20 |
| 63.34 | 5.10 | 12.86 | 22.00 |
| 126.81 | 9.32 | 13.64 | 24.10 |

[1]Sodium cellulosate fabrics containing indicated meqs of sodium cellulosates reacted in DMSO at room temperature with indicated meqs of sodium monochloroacetate. Degree of conversion expressed as meqs of CM.

maxima wrinkle recoveries were obtained with 23 percent NaOH pretreatment. Data in Table IV also illustrate that wrinkle recovery improvements are obtained only when the CM-cottons prepared by the process of this invention are in the acid form and indicate that the presence of the weak carboxyl group (COOH) rather than the carboxylate (COO⁻) group of the salt form is required to complete the hydrogen bonded network required to produce wrinkle resistant cottons. It should also be noted that conversion of CM-cotton to the acid form must be accomplished in aqueous media rather than in a non-aqueous media if the desired product is one with high wrinkle recoveries. For example, if the CM-cotton of D.S. = 0.26 in the salt form is converted to the acid form by treatment with dilute acid in DMF rather than with dilute aqueous (about from 1–2 percent) HCl, its wet and conditioned recovery angles are only 214 and 158 (W+F)° respectively rather than 289 and 239 (W+F)° as shown in Table IV.

TABLE IV

Effect of Sodium Hydroxide Pretreatment on Formation and Properties of Carboxymethylated Fabrics[1]

| Pretreatment NaOH,% | Conversion cellulosate, meq/g | Carboxymethyl substitution | | CMC form[2] | Wrinkle recovery (W+F)° | | Breaking Strength lb | Elongation at break % | Abrasion Resistance cycles |
|---|---|---|---|---|---|---|---|---|---|
| | | meq/g | D.S. | | Wet | Cond. | | | |
| 0 | 1.676 | 0.167 | 0.03 | salt | 149 | 169 | 53 | 14 | 240 |
| | | | | acid | 158 | 190 | 54 | 13 | 235 |
| Control | | | | | 161 | 194 | 45 | 8 | 1319 |
| 5 | 3.117 | 0.814 | 0.14 | salt | 177 | 155 | 41 | 21 | 201 |
| | | | | acid | 219 | 192 | 30 | 14 | 134 |
| Control | | | | | 177 | 172 | 54 | 14 | 170 |
| 10 | 3.101 | 1.079 | 0.19 | salt | 182 | 142 | 42 | 19 | 171 |
| | | | | acid | 240 | 224 | 21 | 14 | 111 |
| Control | | | | | 188 | 175 | 53 | 16 | 230 |
| 15 | 3.730 | 1.451 | 0.25 | salt | 193 | 159 | 46 | 28 | 285 |
| | | | | acid | 282 | 225 | 28 | 21 | 207 |
| Control | | | | | 205 | 176 | 60 | 24 | 346 |
| 23 | 3.696 | 1.478 | 0.26 | salt | 202 | 147 | 53 | 41 | 334 |
| | | | | acid | 289 | 239 | 37 | 23 | 379 |
| Control | | | | | 204 | 178 | 60 | 33 | 768 |

[1]Control cotton pretreated with indicated concentration of aqueous NaOH solvent exchanged in methanol before being converted to sodium cellulosate by reacting in methanolic sodium methoxide. Sodim cellulosates of indicated concentrations then reacted with 2.5% sodium monochloroacetate in DMSO.
[2]CM cotton in sodium salt form. Acid formed by converting salt form by treatment with 0.24M aqueous HCl.

EXAMPLE 5

Samples of cottons were treated according to the process described in Example 1 except that the initial pretreatment of fabric with aqueous NaOH was varied so that the series included fabrics that were not pretreated with base and those that were treated with base solutions varying from 5 to 23 percent aqueous NaOH. A summary of fabric properties obtained by variation of this pretreatment is shown in Table IV. These results are given to illustrate that although cotton can be converted to the sodium cellulosate after no base pretreatment of after pretreatment with dilute base, the conversion to CM-cotton results in products with improved wrinkle recovery in the wet and conditioned states only in those instances where the pretreatment was concentrated enough to affect the crystalline lattice of cotton cellulose. Maximum conversion to CM cotton and

EXAMPLE 6

A series of cotton fabrics were treated by the process described in Example 1 except that the fabrics were left in the salt form of CM-cottons. The fabrics were then padded twice to an approximate 100 percent wet pickup with a 10 percent aqueous solution of dimethylolethyleneurea (DMEU), a conventionally used reagent that imparts wrinkle recovery to cotton when used with an acid catalyst. Data given in Table V are illustrative of the fact that DMEU adds to CM-cottons as evidenced by amounts of nitrogen and formaldehyde combined on the final product. Although CM-cottons of low and high DS values catalyze the cellulose-DMEU reactions without the use of an added external catalyst, it is only with CM-Cottons of low DS such as DS = 0.06 that significant improvements in wrinkle recovery after DMEU treatments are realized.

TABLE V

Effect of Temperature on Properties of CM Cottons in Salt Form Treated with Aqueous DMEU[1]

| Cure temp. °C | N, wt % | HCHO wt % | Wrinkle recovery, (W+F)° | | Breaking strength lb | Elongation at break % | Abrasion resistance cycles |
|---|---|---|---|---|---|---|---|
| | | | Wet | Cond. | | | |
| | | | D.S. = 0.26 | | | | |
| 25[2] | 0.01 | 0.01 | 217 | 180 | 50 | 31 | 432 |
| 100 | 0.08 | 0.14 | 191 | 194 | 52 | 29 | 381 |

TABLE V – Continued

Effect of Temperature on Properties of CM Cottons in Salt Form Treated with Aqueous DMEU[1]

| Cure temp. °C | N. wt % | HCHO wt % | Wrinkle recovery (W+F)° Wet | Cond. | Breaking strength lb | Elongation at break % | Abrasion resistance cycles |
|---|---|---|---|---|---|---|---|
| 120 | 0.25 | 0.25 | 201 | 192 | 50 | 26 | 298 |
| 160 | 1.08 | 1.51 | 206 | 183 | 51 | 32 | 365 |
| CMC control | | | 202 | 147 | 52 | 41 | 334 |
| | | D.S. = 0.06 | | | | | |
| 25[2] | 0.02 | 0.04 | 227 | 197 | 62 | 39 | 426 |
| 100 | 0.09 | 0.10 | 239 | 191 | 57 | 26 | 423 |
| 120 | 0.28 | 0.43 | 243 | 170 | 63 | 29 | 324 |
| 160 | 0.90 | 1.35 | 269 | 212 | 57 | 28 | 365 |
| CMC control | | | 226 | 186 | 60 | 32 | 571 |

[1] Nonaqueously prepared carboxymethylated cottons in sodium salt forms were treated with 10% dimethylolethyleneurea, dried at 60°C for 7 min. and cured at indicated temperatures for 5 min.
[2] Fabrics were dried but not cured.

EXAMPLE 7

A series of cotton fabrics were treated by the process described in Example 1 until the final product had a DS of 0.26 with respect to CM group. These CM cottons were converted to the acid form by treatment with dilute aqueous HCl, washed and dried before being twice padded with 10 percent aqueous DMEU as were the salt forms of CM cottons described in Example 6. The acid form of CM cotton was less effective than the salt forms of CM cotton in catalyzing the cellulose-DMEU reaction. Data in Table VI are illustrative of the small add-ons of Nitrogen and formaldehyde and show that conditioned recoveries were lowered but wet recoveries improved at these low add-ons of DMEU.

TABLE VI

Effect of Temperature Properties of CM Cotton in Acid Form Treated with Aqueous DMEU[1]

| Cure Temp. °C | N.wt. % | HCHO wt % | Wrinkle recovery (W+F)° Wet | Cond. | Breaking Strength lb | Elongation at break % | Abrasion resistance cycles |
|---|---|---|---|---|---|---|---|
| 25[2] | 0.06 | 0.04 | 271 | 208 | 43 | 28 | 306 |
| 100 | 0.06 | 0.05 | 273 | 219 | 46 | 29 | 301 |
| 120 | 0.10 | 0.07 | 270 | 208 | 40 | 24 | 293 |
| 160 | 0.10 | 0.15 | 299 | 199 | 37 | 23 | 284 |
| CMC control | | | 257 | 239 | 37 | 23 | 379 |

[1] Nonaqueously prepared carboxymethylated cottons of 0.26 D.S. converted to acid form by treatment with aqueous HCl, washed, dried, and then treated with 10% dimethylolethylenurea in water. Fabrics were dried 7 min at 60°C and cured for 5 min at indicated temperature.
[2] Fabrics were dried but not cured.

We claim:

1. An improved process for the preparation of carboxymethylated cotton, the process comprising reacting anhydrous sodium cellulosate with about 2.5 percent of a salt of monochloroacetate in an anhydrous dimethylsulfoxide solution for from 6 minutes to 72 hours, depending upon the degree of substitution desired, under an inert, dry atmosphere, thereby producing a carboxymethylated fibrous cellulosic product which is insoluble in either acid or basic solutions.

2. The process of claim 1 wherein the salt is sodium monochloracetate.

3. The process of claim 1 wherein the salt is tetramethyl ammonium monochloracetate.

4. The process of claim 1 wherein said sodium cellulosate was prepared from cotton textile which had been pretreated with a swelling agent to swell the crystalline lattice of the cotton.

5. The process of claim 4 wherein the swelling agent was 15–23 percent NaOH.

6. The process of claim 4 wherein the carboxymethylated fibrous cellulosic textile product is impregnated with an aqueous hydrochloric acid or acetic acid solution, thereby converting said textile product to its acid form, washed with deionized water and dried by ironing at temperatures below about 160° C.

7. The process of claim 4 wherein the carboxymethylated textile product is impregnated with a solution of a dimethylolated urea free of catalyst, dried and cured to crosslink said textile fabric.

8. The fibrous carboxymethylated cellulosic cationic exchanger produced by the process of claim 1.

9. The wrinkle resistant carboxymethylated cellulosic textile produced by the process of claim 6.

10. The crosslinked, wrinkle resistant carboxymethylated cellulosic textile produced by the process of claim 7.

* * * * *